United States Patent
Bryant

[15] 3,662,386
[45] May 9, 1972

[54] PROGRAMMABLE 20-BIT PSEUDORANDOM (PRF) GENERATOR

[72] Inventor: Kenneth O. Bryant, Ridgecrest, Calif.

[73] Assignee: The United States of America as represented by the Secretary of the Navy

[22] Filed: May 4, 1970

[21] Appl. No.: 34,225

[52] U.S. Cl. .................................. 343/17.1 PF, 343/18 E
[51] Int. Cl. ............................................ G01s 7/36, G01s 7/30
[58] Field of Search .................... 343/17.1 PF, 17.1 R, 18 E

[56] References Cited

UNITED STATES PATENTS 3,229,288 1/1966 Massey ........................... 343/17.1 PF
3,243,814 3/1966 Massey ........................... 343/17.1 PF

FOREIGN PATENTS OR APPLICATIONS 253,435 10/1962 Australia ........................... 343/17.1 P Primary Examiner—Benjamin A. Borchelt
Assistant Examiner—G. E. Montone
Attorney—R. S. Sciascia and Roy Miller

[57] ABSTRACT

A programmable pseudorandom PRF generator for generating allowable combinations of PRF and jitter percent comprising a program selector means for inspecting the output of the selector for unwanted codes and a 20-bit pseudorandom generator for generating an output pulse having an allowed combination of PRF and jitter percent such that the output pulse, when jittered, has the same average frequency as the unjittered pulse.

6 Claims, 12 Drawing Figures

| DATA | T | T | T | T | T |
|---|---|---|---|---|---|
| DATA GATE (T-3) | F | T | T | F | F |
| OUTPUT GATE °  | T | T | T | T | T |
| LATCH GATE (T̄1) | T | F | T | T | T |

° ASSUMED TO BE LATCHED TRUE FROM PREVIOUS COMMUTATION CYCLE

INVENTOR.
KENNETH O. BRYANT
BY

ROY MILLER
ATTORNEY

NOTE: PTC = FA OR FA/2 OR FA/3
NOTE: P REGISTER IS SET TO 128 AT T1
NOTE: P REGISTER IS SET FROM R REGISTER FOR X ≠ 0

PROGRAMMABLE 20-BIT PSEUDORANDOM (PRF) GENERATOR

GOVERNMENT INTEREST

The invention described herein may be manufactured and used by or for the Government of the United States of America for governmental purposes without the payment of any royalties thereon or therefor.

BACKGROUND OF THE INVENTION

The programmable 20-bit pseudorandom pulse repetition frequency generator, hereinafter referred to as the pseudorandom PRF generator, is intended for use with a phase-array-antenna radar and may be used with any radar transmitter which requires a trigger pulse (T2). In the particular implementation which will be hereinafter set forth, outputs $a'$, $b'$, $c'$, and MB (main bang), radar, computer and display sync pulses and a rain-reject control voltage are provided which functions adapt the generator for use with a multitrack radar but do not effect its general utility.

DESCRIPTION OF THE PREFERRED EMBODIMENT

The pseudorandom generator will be described as implemented for use with a radar transmitter of the characteristics listed below:

| | |
|---|---|
| Peak voltage | 2 volts dc |
| Pulse width | 0.33 microseconds |
| Repetition rate | 280 to 2000 PPS |
| Jitter | 0, 12.8, 25.6, or 38.4% |

Figure 1:
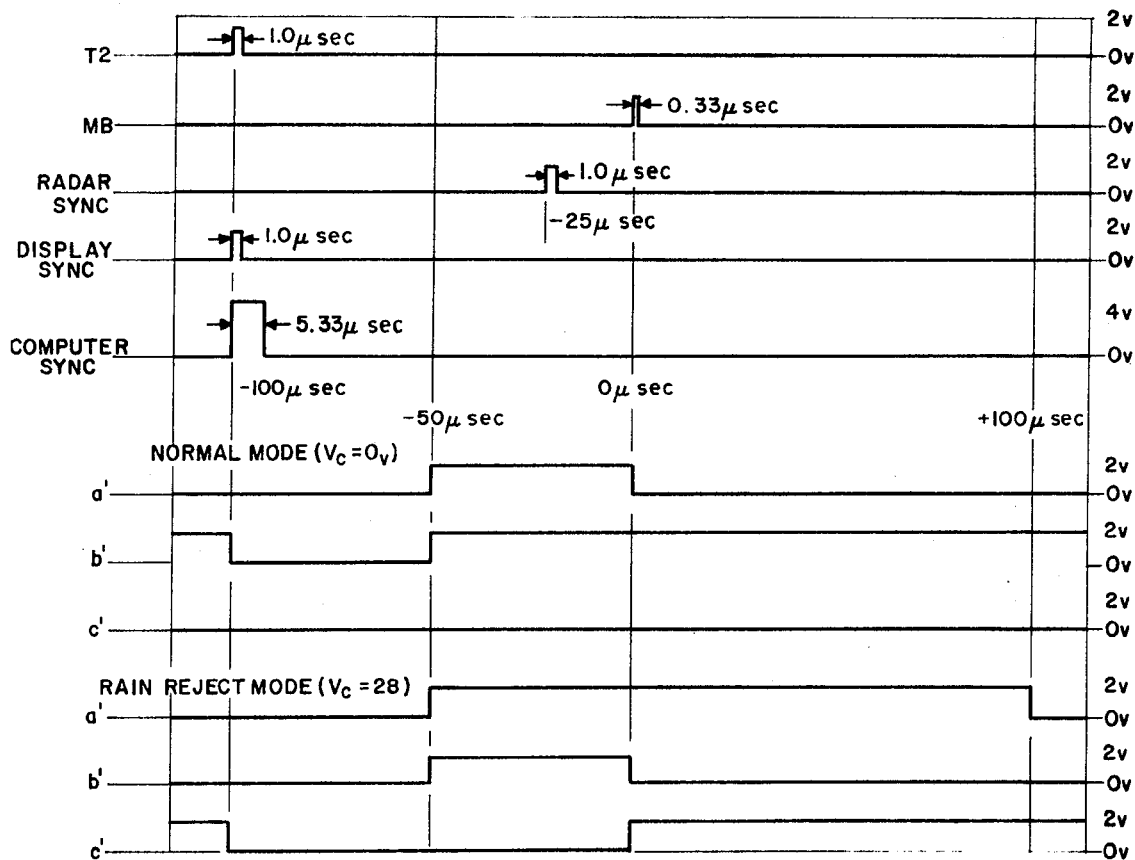
FIG. 1 illustrates the outputs of the pseudorandom PRF generator.

The electrical outputs of the pseudorandom PRF generator are illustrated in FIG. 1. The abbreviation MB denotes the output pulse which, after amplification and reshaping, modulates the radar transmitter pulse or main bang.

The physical equipment incorporates various manual controls on the front panel thereof including switches 1 through 5. Switch 1 is a four position four-deck rotary switch which, in positions 1, 2, and 3 channels select functions to receptacles so that the code is selected by external equipment or by jumpered code plugs connected to the receptacles. In position 4 it connects channel select function to local panel controls.

Switch 2 is an eighth position three deck rotary DIGISWITCH which encodes digital logic for $E''$, $D''$, and $C''$. Switch 3 is an eighth position two deck rotary DIGISWITCH which encodes digital logic for $B''$ and $A''$. Switch 4 is an eighth position three deck rotary DIGISWITCH which encodes digital logic for $0'$, $K_2'$ and $K_1'$. Switch 5 is a double-pole double-throw toggle switch which selects rain reject or normal function.

Program Selector

The program selector comprises the three eight position (0 through 7) DIGISWITCHES switch 2, switch 3 and switch 4 mounted on the front panel of the equipment. The three thumb wheels are exposed through the front panel. The switches convert decimal digits 0 through 7 to binary digits 000 through 111. Switches 2 and 3 serve to set the output PRF, and switch 4 serves to set the percent of jitter. Instructions for selecting permitted frequency and jitter percent combinations are given on the front panel. However, if an unpermitted combination of PRF and jitter percent is set into the program selector, logic in the inspect for unwanted codes portion of the equipment inhibits use of the unwanted code. Permitted combinations of PRF and jitter percent are given in Table 1. Selection percent is given in Table 2. The two tables, taken together, include all possible positions of the program selector, both permitted and unpermitted.

Unwanted Codes

An unwanted code is one that gives PRF or jitter percent that cannot be used with a particular radar set when using a 6-megacycle clock oscillator. In the configuration of the pseudorandom PRF generator, the upper PRF limit (2000 PPS) is determined by the permissible duty cycle of the radar transmitter involved. The lower limit (280 PPS) is the lowest PRF that permits efficient use of the range data handling facilities of the radar set. Jitter percents are limited to those which do not produce an upper frequency, $F_U$, exceeding 2,000 PPS or a lower frequency, $F_L$, below 280 PPS. It is to be understood that by wiring changes in the pseudorandom PRF generator, PRF limits and jitter percent limits could be set to meet the requirements of another particular set.

Mechanization

The pseudorandom PRF generator is unique in that the pulse, when jittered, has the same average frequency as the unjittered pulse. Thus, when the generator is set at PRF = 1,000 with 12.8, 25.6, or 38.4 percent jitter, the average output PRF remains 1,000. Briefly, the machine starts with a 6-Mc oscillator. The 6 Mc is counted down to produce FA, which is 1,000 times the desired output. For 0 or 12.6 percent jitter, FA becomes the pseudo time count (PTC) used to produce the output pulse. For 25.6 percent jitter, FA is divided by 2 to produce PTC pulses. For 38.4 percent jitter, FA is divided by 3 to produce PTC pulses. The PTC pulses are counted down by $K + M$ to produce the jittered pulse, where $K$ is a constant and $M$ is a random digit between 1 and 256. For 0 or 12.8 percent jitter, the average of $K + M = 1,000$; for 25.6 percent jitter, the average of $K + M = 500$; and for 38.4 percent jitter, the average of $K + M = 333$. This arrangement compensates the division of FA. The pulse output T2 triggers circuits in the delay counter to produce the MB pulse, and $\overline{A}$, $\overline{B}$, $a'$, $b'$, and $c'$, as required by the radar set. Circuitry is discussed under Theory of Operation.

THEORY OF OPERATION

Figure 2:
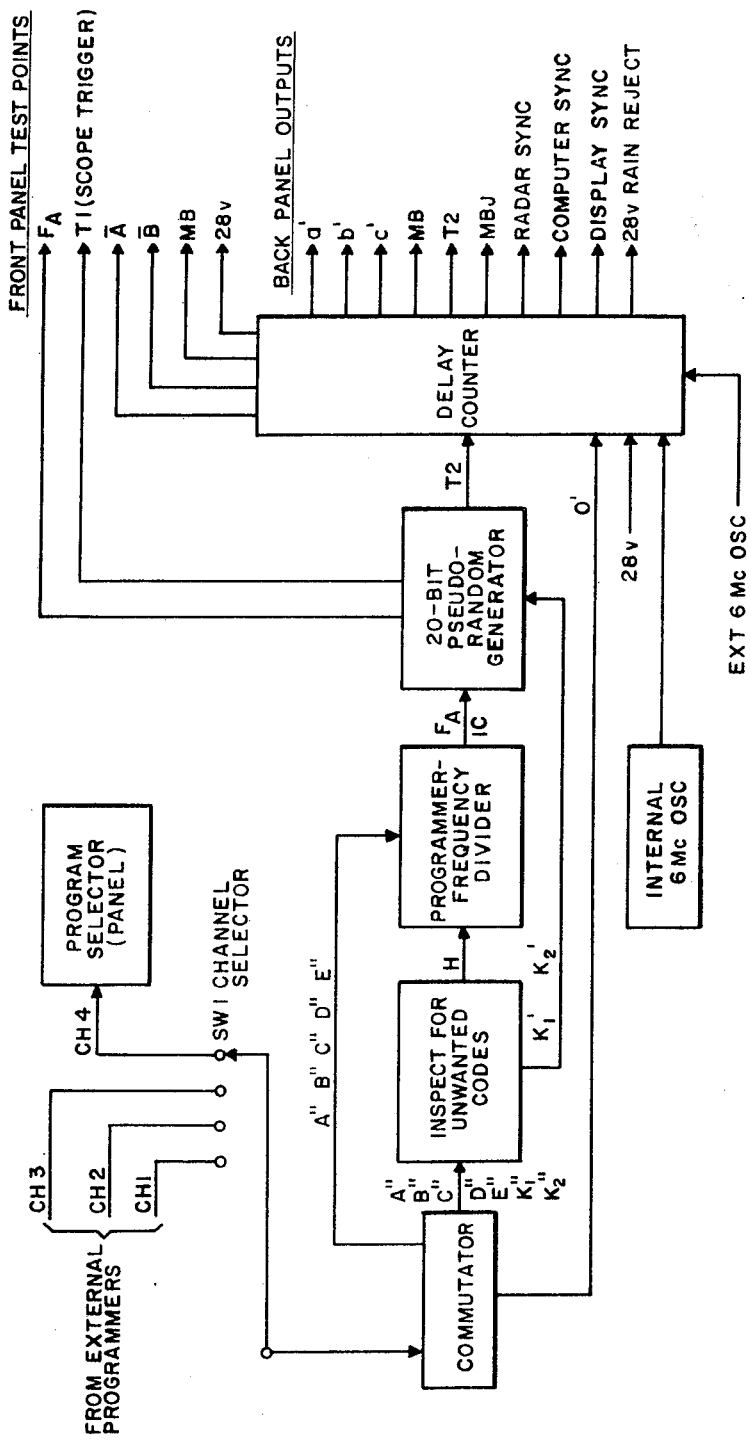
FIG. 2 is a functional block diagram of the generator.

Functions of the pseudorandom PRF generator are shown in FIG. 2. The blocks of this diagram do not represent equipment sections or components, but represent functions as described below. All of the functions, except manual program selection, are performed by circuits in the 24-card file.

Program Selection

The CHANNEL SELECTOR switch SW1 serves to connect the local PROGRAM SELECTOR or one of three remote program selectors (not part of this equipment) or three prewired programs by jumpering the proper pins or plug to the digital computing circuits. If CH 4 (local) is selected, the three Digiswitches, SW2, SW3, and SW4, are used to set up the required PRF and jitter percent.

Commutator

The commutator is an eight-circuit, buffered-latch matrix with four buffered AND gates added. This function receives PRF and jitter percent instructions from the selected PROGRAM SELECTOR in binary form, and sends them to the required functions.

Inspect for Unwanted Codes

This function receives the encoded instructions for PRF and jitter percent from the commutator, and sends an enable signal, H, to the programmer-frequency divider if a permitted PRF and jitter percent combination (Table 1) has been set

TABLE 1.—PRF SELECTION AND PERMITTED JITTER PERCENTS

| Program selector position | F_c (p.p.s.) | y | SW2-4 E'' | SW2-2 D'' | SW2-1 C'' | SW3-1 B'' | SW3-2 A'' | Per-mitted | PCT jitter (x) permitted 0 | 12.8 | 26.6 | 38.4 |
|---|---|---|---|---|---|---|---|---|---|---|---|---|
| 22 | 3,000 | 2 | 0 | 1 | 0 | 1 | 0 | No | No | No | No | No |
| 31 | 2,000 | 3 | 0 | 1 | 1 | 0 | 1 | Yes | Yes | No | No | No |
| 41 | 1,500 | 4 | 1 | 0 | 0 | 0 | 1 | | | Yes | Yes | No |
| 53 | 1,200 | 5 | 1 | 0 | 1 | 1 | 1 | | | | | Yes |
| 61 | 1,000 | 6 | 1 | 1 | 0 | 0 | 1 | | | | | |
| 40 | 857.1 | 7 | 1 | 0 | 0 | 0 | 0 | | | | | |
| 32 | 750.0 | 8 | 0 | 1 | 1 | 1 | 0 | | | | | |
| 02 | 666.7 | 9 | 0 | 0 | 0 | 1 | 0 | | | | | |
| 52 | 600.0 | 10 | 1 | 0 | 1 | 1 | 0 | | | | | Yes |
| 10 | 545.5 | 11 | 0 | 0 | 1 | 0 | 0 | | | | | No |
| 13 | 500.0 | 12 | 0 | 0 | 1 | 1 | 1 | | | | | |
| 62 | 461.5 | 13 | 1 | 1 | 0 | 1 | 0 | | | | | |
| 72 | 428.6 | 14 | 1 | 1 | 1 | 1 | 0 | | | Yes | Yes | |
| 21 | 400.0 | 15 | 0 | 1 | 0 | 0 | 1 | | | No | No | |
| 23 | 375.0 | 16 | 0 | 1 | 0 | 1 | 1 | | | | | |
| 70 | 352.9 | 17 | 1 | 1 | 1 | 0 | 0 | | | | | |
| 60 | 333.3 | 18 | 1 | 1 | 0 | 0 | 0 | | | | | |
| 11 | 315.7 | 19 | 0 | 0 | 1 | 0 | 1 | | | | | |
| 12 | 300.0 | 20 | 0 | 0 | 1 | 1 | 0 | | | | | |
| 50 | 285.7 | 21 | 1 | 0 | 1 | 0 | 0 | Yes | Yes | | | |
| 00 | 272.7 | 22 | 0 | 0 | 0 | 0 | 0 | No | No | | | |
| 30 | 260.9 | 23 | 0 | 1 | 1 | 0 | 0 | | | | | |
| 42 | 250.0 | 24 | 1 | 0 | 0 | 1 | 0 | | | | | |
| 03 | 240.0 | 25 | 1 | 1 | 0 | 1 | 1 | | | | | |
| 51 | 230.8 | 26 | 1 | 0 | 1 | 0 | 1 | | | | | |
| 43 | 222.2 | 27 | 1 | 0 | 0 | 1 | 1 | | | | | |
| 33 | 214.3 | 28 | 0 | 1 | 1 | 1 | 1 | | | | | |
| 20 | 206.9 | 29 | 0 | 1 | 0 | 0 | 0 | | | | | |
| 03 | 200.0 | 30 | 0 | 0 | 0 | 1 | 1 | | | | | |
| 23 | 0 | 0 | 1 | 1 | 1 | 1 | 1 | | | | | |
| 01 | 187.5 | 32 | 0 | 0 | 0 | 0 | 1 | | | | | |
| 71 | 333.3 | 18 | 1 | 1 | 1 | 0 | 1 | No | No | No | No | No |

TABLE 2. SELECTION OF PRF JITTER PERCENT (X)

| Program selector position | PCT jitter (x) | SW4-4 O' | SW4-2 K'_2 | SW4-1 K'_1 | Oscillator |
|---|---|---|---|---|---|
| 0 | 12.8 | 0 | 0 | 0 | Internal. |
| 1 | 25.6 | 0 | 0 | 1 | Do. |
| 2 | 0 | 0 | 1 | 0 | Do. |
| 3 | 38.4 | 0 | 1 | 1 | Do. |
| 4 | 12.8 | 1 | 0 | 0 | External. |
| 5 | 25.6 | 1 | 0 | 1 | Do. |
| 6 | 0 | 1 | 1 | 0 | Do. |
| 7 | 38.4 | 1 | 1 | 1 | Do. | into the PROGRAM SELECTOR. If an unpermitted PRF and jitter combination has been set into the program selector, an inhibit signal, $\overline{H}$, which inhibits any change of the PRF and jitter percent, is sent to the programmer-frequency divider.

Programmer-Frequency Divider

This function receives enable signal H, clock pulses, and an eight-digit word from the Inspect for Unwanted Codes. The word is detected to determine the frequency divisor $y$. FA is produced by dividing the internal or external 6-Mc clock frequency by $y$. See Table 1 for permitted values of $y$. FA is sent to the 20-bit pseudorandom PRF generator.

20-Bit Pseudorandom Function

This function receives $K_1'$ and $K_2'$ from the Inspect for Unwanted Codes and FA from the programmer-frequency divider, and delivers pulse T2 to the delay counter. The PRF and jitter percent of the T2 pulse are in accordance with the last permissible program set into the local or remote PROGRAM SELECTOR.

Delay Counter

This function receives the T2 pulse from the 20-bit pseudorandom function and clock pulses from the 6-Mc oscillator and produces the MB, $\overline{A}$, $\overline{B}$, $a'$, $b'$, and $c'$ pulses. These gates adapt the generator for use with the multitrack radar, but do not impair its general utility. Also produced in the delay counter are the radar, computer, and display sync pulses.

COMMUTATOR

Figure 4:
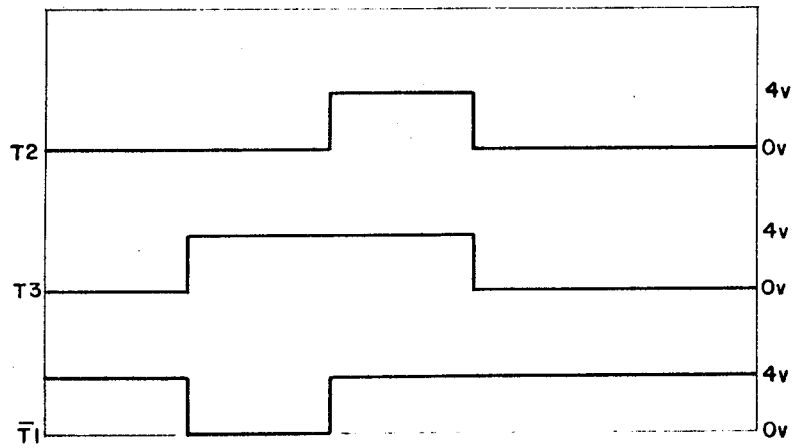
FIG. 4 illustrates commutator waveforms and truth table therefore.
Figure 3:
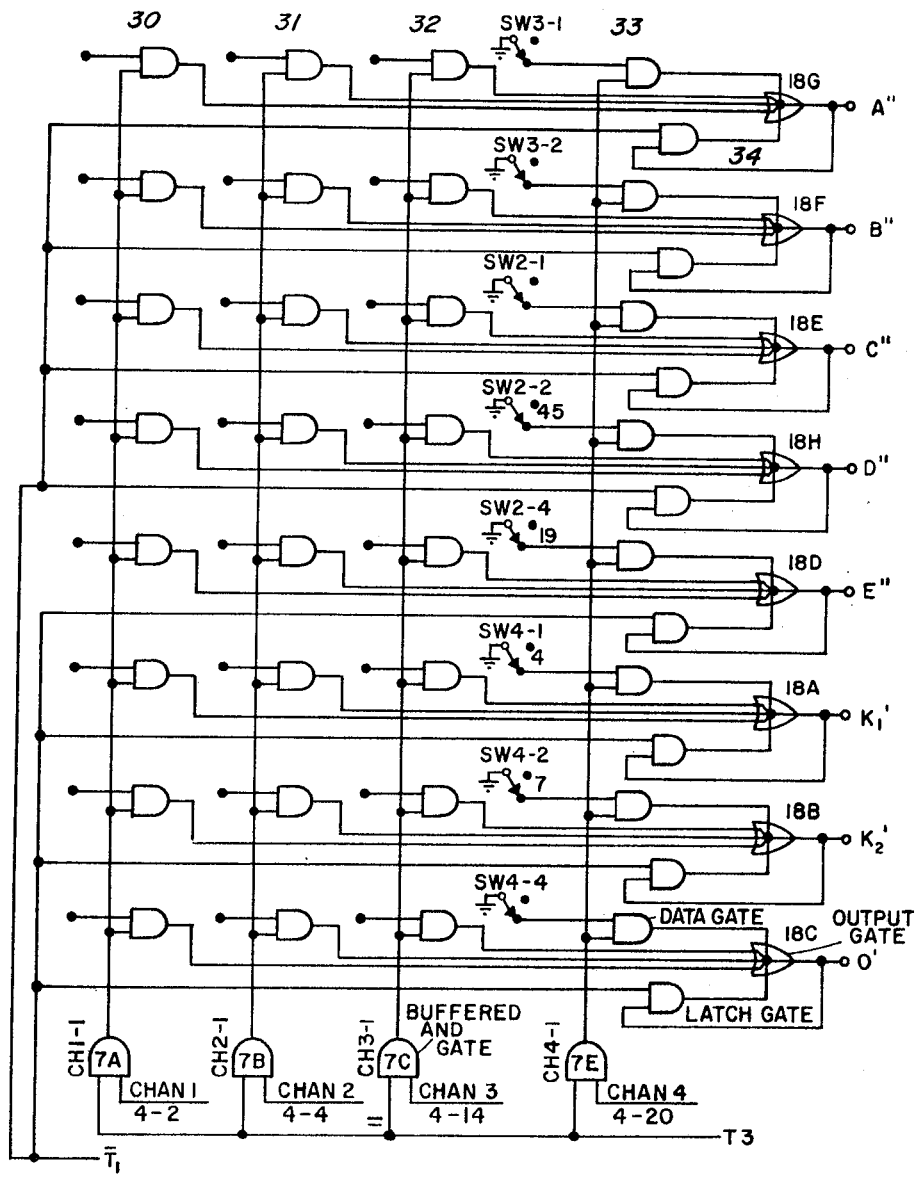
FIG. 3 is a logic diagram of the commutator.

This function comprises one FT-26 gated latch circuit matrix and four buffered AND channel gates (FIG. 3). The commutator waveforms and corresponding truth table are set forth in FIG. 4. Each of the eight data channels comprises five AND gates and a buffered OR output gate. In each data channel one AND gate is connected to latch the OR gate. For instance, the A'' channel comprises AND gates 30 – 34 and OR gate 18G.

Channel Selection

From CHANNEL SELECTOR switch SW1 a TRUE (+4 volts is set into one input of one of the corresponding buffered AND channel selector gates 7A, 7B, 7C or 7E. The other input receives T3. Output of the buffered AND gate is TRUE for the selected channel during T3.

Data Channels

Each of the eight AND/OR gate circuits comprises a data channel. Each of the PRF select parameters, A'', B'', C'', D'', and E''; each of the jitter percent parameters, $K_1'$ and $K_2'$; and local internal-external oscillator parameter O' from the local or remote PROGRAM SELECTOR are fed into one input of the corresponding data channel AND gate, for example, gate 33. The other input of all data AND gates is connected to the output of the corresponding channel selector gate.

Latch Gate

The output of the buffered OR output gate is fed back to one input of the corresponding latch gate, for example, gate 34. The other input of all latch gates is connected to $\overline{T1}$. To illustrate operation of the commutator, assume that Channel 4 has been selected and that A'' TRUE has been set into the program. The outputs of AND gates 30, 31, and 32 are FALSE, since the outputs of buffered AND gates 7A, 7B, and 7C are FALSE. For the duration of T3, the output of buffered AND gate 7E becomes TRUE, since both Channel 4 select and T3 are TRUE. The output of AND gate 33 becomes TRUE for the duration of T3, since both T3 and A'' are TRUE. For the duration of T1, output of the latch gate 34 is FALSE, and the A'' TRUE is set into the output buffered OR gate 18G. At the trailing edge of T1, $\overline{T1}$ returns to TRUE, both inputs to the latch gate 34 are TRUE, and the output of the latch gate 34 goes to TRUE. At the trailing edge of T3, output of AND gate 33 becomes FALSE, but output of the latch gate 34 remains TRUE. The buffered OR gate 18G goes TRUE, since it has but one TRUE input, and remains latched until the next commutation cycle. Had A'' FALSE been set into the programmer, the outputs of the data gate 33, output gate 18G, and latch gate 34 would have remained FALSE throughout the commutation cycle. All other commutator circuits operate in the same manner but carry PRF parameters B'', C'', D'', or E'', jitter percent parameters $K_1'$ or $K_2'$, or internal-external oscillator parameter O'.

INSPECT FOR UNWANTED CODES

Figure 5:
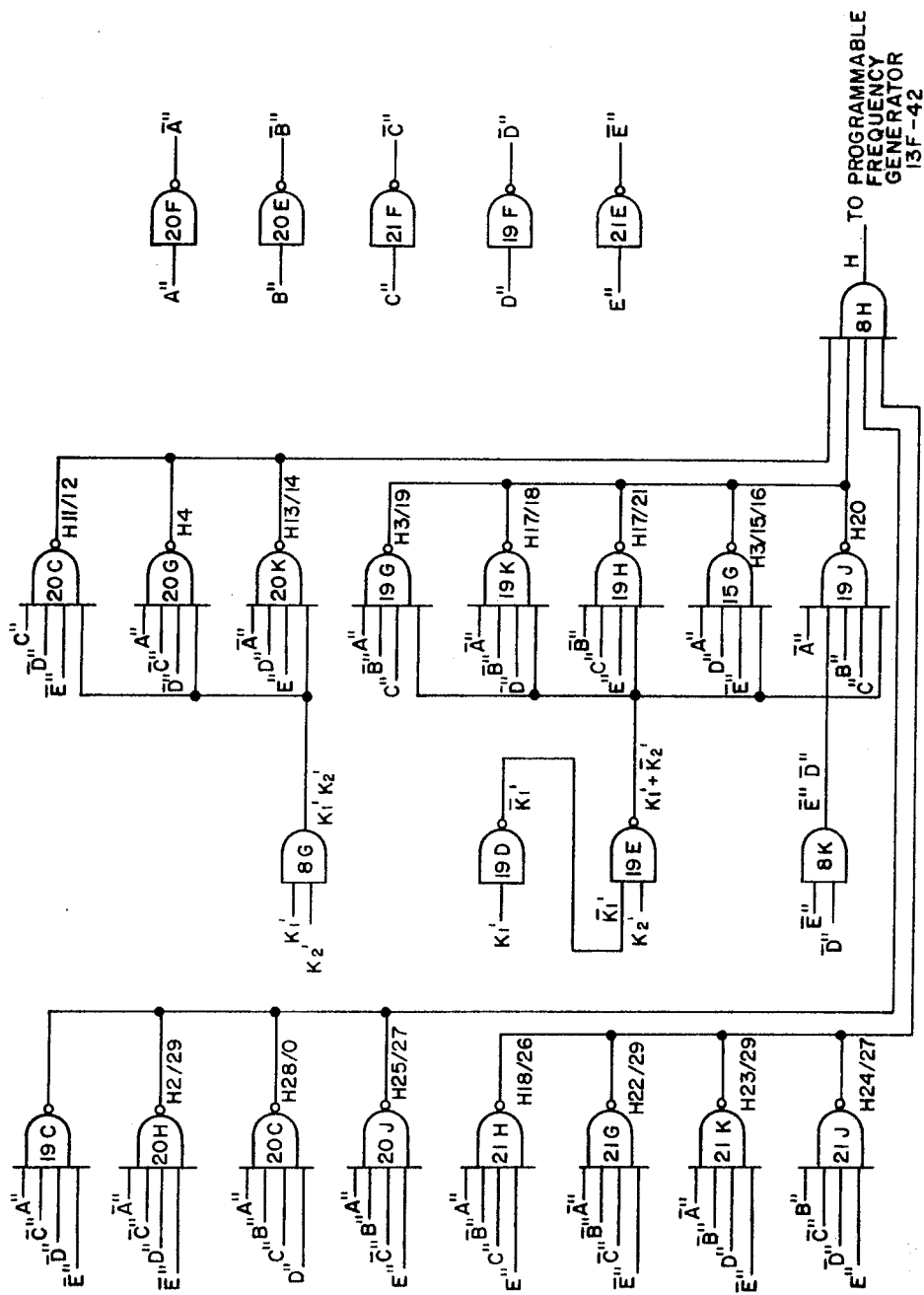
FIG. 5 is a logic diagram of the inspect for unwanted codes.

This function comprises 23 buffered NAND gates (19C, 20H, 21C, 20J, 21H, 21G, 21K, 21J, 19D, 19E, 20C, 20G, 20K, 19G, 19K, 19H, 15G, 19J, 20F, 20E, 21F, 19F and 21E) and three buffered AND gates (8G, 8H and 8K, FIG. 5). Seventeen of the NAND gates (19C, 20H, 21C, 20J, 21H, 21G, 21K, 21J, 19E, 20C, 20G, 20K, 19G, 19K, 19H, 15G and 19J) screen the preset code for unwanted codes, and six of the NAND gates (19D, 20F, 20E, 21F, 19F and 21E) serve as buffered inverters which invert $A''$, $B''$, $C''$, $D''$, $E''$, and $K_1'$ to produce $\overline{A}''$, $\overline{B}''$, $\overline{C}''$, $\overline{D}''$, $\overline{E}''$, and $\overline{K}_1'$. These inverted parameters are used within this function to mechanize the unwanted code inhibit.

Logic

This function mechanizes the equation:
$$[0+2+18'+(20+21+22+...+30)+32]$$
$$+[12.8\%+25.6\%][3+(15+16+17+...+21)]$$
$$+38.4\%[3+4+(11+12+13+...+21)] = H$$

Numbers in the above equations are possible values of $y$, and the percents are possible values of $x$ (see Tables 1 and 2). Outputs of the NAND gates are connected in one group of three, two groups of four, and one group of five. Each group is connected to an input of AND gate 8H. If all of the inputs to any of the NAND gates become TRUE, the corresponding gate output becomes FALSE. Thus, one input to AND gate 8H becomes FALSE, and the output (H) of AND gate 8H becomes FALSE. When H is FALSE, the programmer-frequency divider operates in accordance with the last permitted code set into the PROGRAM SELECTOR.

Codes Totally Inhibited

To illustrate operation of this process consider PROGRAM SELECTOR Codes 01 and 03 (see Table 2). The program parameters are as follows:

| SW2 and SW3 position | y | $E''$ | $D''$ | $C''$ | $B''$ | $A''$ |
|---|---|---|---|---|---|---|
| 01 | 32 | 0 | 0 | 0 | 0 | 1 |
| 03 | 30 | 0 | 0 | 0 | 1 | 1 |

In these two codes, $E''$, $D''$, $C''$, and $A''$ are alike. Parameters $\overline{E}''$, $\overline{D}''$, $\overline{C}''$, and $A''$ are connected to the inputs of NAND gate 19C. If either Code 01 or 03 is set into the PROGRAM SELECTOR, $\overline{E} \cdot \overline{D}'' \cdot \overline{C}'' \cdot A''$ are fed to NAND gate 19 and the output of the gate becomes FALSE. This FALSE, in turn, drives AND gate 8H FALSE, thus inhibiting the unwanted code. Other PROGRAM SELECTOR codes eliminated in this manner shown in Table 3.

TABLE 3.

PROGRAM SELECTOR Codes Totally Inhibited

| PROGRAM SELECTOR SW2 and SW3 setting | y | Inhibiting gates |
|---|---|---|
| 00 | 22 | 21G |
| 01 | 32 | 19C |
| 03 | 30 | 19C |
| 20 | 29 | 20H, 21G, 21K |
| 22 | 2 | 20H |
| 23 | 0 | 21C |
| 30 | 23 | 21K |
| 33 | 28 | 21C |
| 42 | 24 | 21J |
| 43 | 27 | 20J, 21J |
| 51 | 26 | 21H |
| 63 | 25 | 20J |
| 71 | 18' | 21H |

Codes Limited to 0-percent Jitter

To illustrate operation of this process, consider PROGRAM SELECTOR codes $310(y = 3, x = 12.8$ percent$)$, $312(y = 3, x = 25.6$ percent$)$, and $313(y = 3, x = 38.4$ percent$)$. NAND gates 15G, 19G, 19H, 19J, and 19K are connected to one input of AND gate 8H so that, if all inputs to any one of these NAND gates are TRUE, the output of the corresponding NAND gate goes FALSE, output of AND gate 8H goes FALSE ($\overline{H}$), and the code set into the PROGRAM SELECTOR is inhibited.

Jitter percent parameter $K_1'$ is inverted in NAND gate 19D to produce $\overline{K}_1'$. Jitter percent parameters $\overline{K}_1'$ and $K_2'$ are connected to the inputs of NAND gate 19E, so that the gate output remains TRUE for all values of $K_1'$ and $K_2'$ except $K_1' =$ FALSE or $K_2' =$ TRUE. The output $K_1' + \overline{K}_2'$ of NAND gate 19E is connected to one input of each of NAND gates 15G, 19G, 19H, 19J, and 19K. When code 312 is set into the PROGRAM SELECTOR, inputs A, D, and $\overline{E}$ to NAND gate 15G go TRUE, but the other input (from NAND gate 19E) remains FALSE. The output of NAND gate 15G remains TRUE, and the output of AND gate 8H remains TRUE (H). If Code 310, 311, or 313 is set into the PROGRAM SELECTOR, the output of NAND gate 19E goes TRUE, all inputs to NAND gate 15G are TRUE, and the gate 15G goes FALSE. With one FALSE input, AND gate 8H goes FALSE ($\overline{H}$), and the code set into the PROGRAM SELECTOR is inhibited. Other PROGRAM SELECTOR codes inhibited in this manner are shown in Table 4.

TABLE 4.

PROGRAM SELECTOR Codes Limited to 0-Pct Jitter

| PROGRAM SELECTOR SW2, SW3, and SW4 setting | y | Inhibiting gates |
|---|---|---|
| 110, 111, 113 | 19 | 19E, 19G |
| 120, 121, 123 | 20 | 19E, 19J |
| 210, 211, 213 | 15 | 19E, 15G |
| 230, 231, 233 | 16 | 19E, 15G |
| 310, 311, 313 | 3 | 19E, 19G, 15G |
| 500, 501, 503 | 21 | 19E, 19H |
| 600, 601, 603 | 18 | 19E, 19K |
| 700, 701, 703 | 17 | 19E, 19K, 19H |

Codes in Which 38.4 Percent Jitter is Inhibited

To illustrate operation of this process, consider PROGRAM SELECTOR Code $103(y = 11, x = 38.4$ percent$)$. The output $K_1' \cdot K_2'$ of AND gate 8G is connected to one input of each of NAND gates 20C, 20G, and 20H. The outputs of these NAND gates are connected as one input to AND gate 8H. With the PROGRAM SELECTOR set to 103, $K_1'$ and $K_2'$ are both TRUE, so that the output of AND gate 8G is TRUE. In Code 103, $C''$, $\overline{D}''$, and $\overline{E}''$ are TRUE. With all four inputs to NAND gate 20C TRUE, the output goes FALSE. One input to AND gate 8H is thus FALSE. The output of AND gate 8H goes FALSE ($\overline{H}$) and the code is inhibited. Other codes in which 38.4 percent jitter is inhibited are shown in Table 5.

TABLE 5.

PROGRAM SELECTOR Codes in which 38.4 percent jitter is inhibited

| PROGRAM SELECTOR SW2, SW3, and SW4 setting | y | Inhibiting gates |
|---|---|---|
| 103 | 11 | 8G, 20C |
| 133 | 12 | 8G, 20C |
| 413 | 4 | 8G, 20G |
| 623 | 13 | 8G, 20K |
| 723 | 14 | 8G, 20K |

Redundant Inhibition

Examination of Tables 3, 4, and 5 reveals some redundant inhibitions. This condition does not interfere with circuit function and permits the function to be accomplished with fewer gates. PROGRAM SELECTOR codes subjected to redundant inhibition are given in Table 6.

TABLE 6.

PROGRAM SELECTOR Codes With Redundant Inhibition

| PROGRAM SELECTOR code | y | x (pct) | Primary gate | Redundant gates |
|---|---|---|---|---|
| 013 | 32 | 38.4 | 19C | 20G |
| 033 | 30 | 38.4 | 19C | 20G |
| 113 | 19 | 38.4 | 19G | 20C |
| 123 | 20 | 38.4 | 19J | 20C |
| 200 | 29 | 12.8 | 20H | 21G, 21K, 19K |
| 201 | 29 | 25.6 | 20H | 21G, 21K, 19K |
| 202 | 29 | 0 | 20H | 21G, 21K |
| 203 | 29 | 38.4 | 20H | 21G, 21K, 19K |
| 230 | 0 | 12.8 | 21C | 19G |
| 231 | 0 | 25.6 | 21C | 19G |
| 233 | 0 | 38.4 | 21C | 19G |
| 300 | 23 | 12.8 | 21K | 19K |
| 301 | 23 | 25.6 | 21K | 19K |
| 303 | 23 | 38.4 | 21K | 19K |
| 330 | 28 | 12.8 | 21C | 15G, 19G |
| 331 | 28 | 25.6 | 21C | 15G, 19G |
| 333 | 28 | 38.4 | 21C | 15G, 19G |
| 430 | 27 | 12.8 | 20J | 21K |
| 431 | 27 | 25.6 | 20J | 21K |
| 432 | 27 | 0 | 20J | 21K |
| 433 | 27 | 38.4 | 20J | 21K |
| 500 | 21 | 12.8 | 19H | 19H |
| 501 | 21 | 25.6 | 19H | 19H |
| 503 | 21 | 38.4 | 19H | 19H |
| 510 | 26 | 12.8 | 21H | 19H |
| 511 | 26 | 25.6 | 21H | 19H |
| 513 | 26 | 38.4 | 21H | 19H |
| 603 | 18 | 38.4 | 19K | 20K |
| 703 | 17 | 38.4 | 19K | 20K |
| 710 | 18' | 12.8 | 21H | 19H |
| 711 | 18' | 25.6 | 21H | 19H |
| 713 | 18' | 38.4 | 21H | 19H |

PROGRAMMER-FREQUENCY DIVIDER

Figure 6:
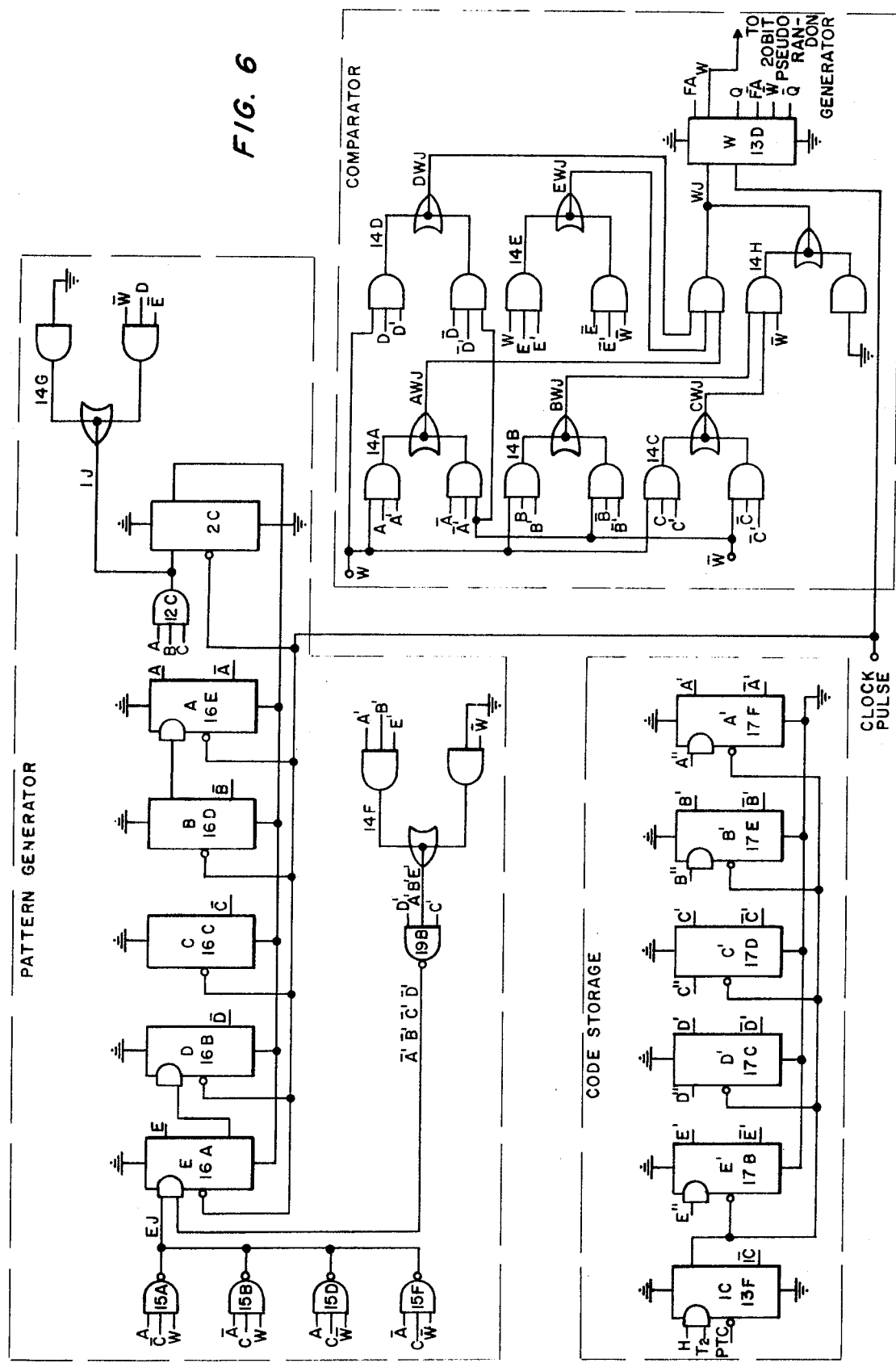
FIG. 6 is a logic diagram of the programmer-frequency divider.

This function comprises three subfunctions: code storage, pattern generator, and comparator (see FIG. 6).

Code Storage

Figure 7:
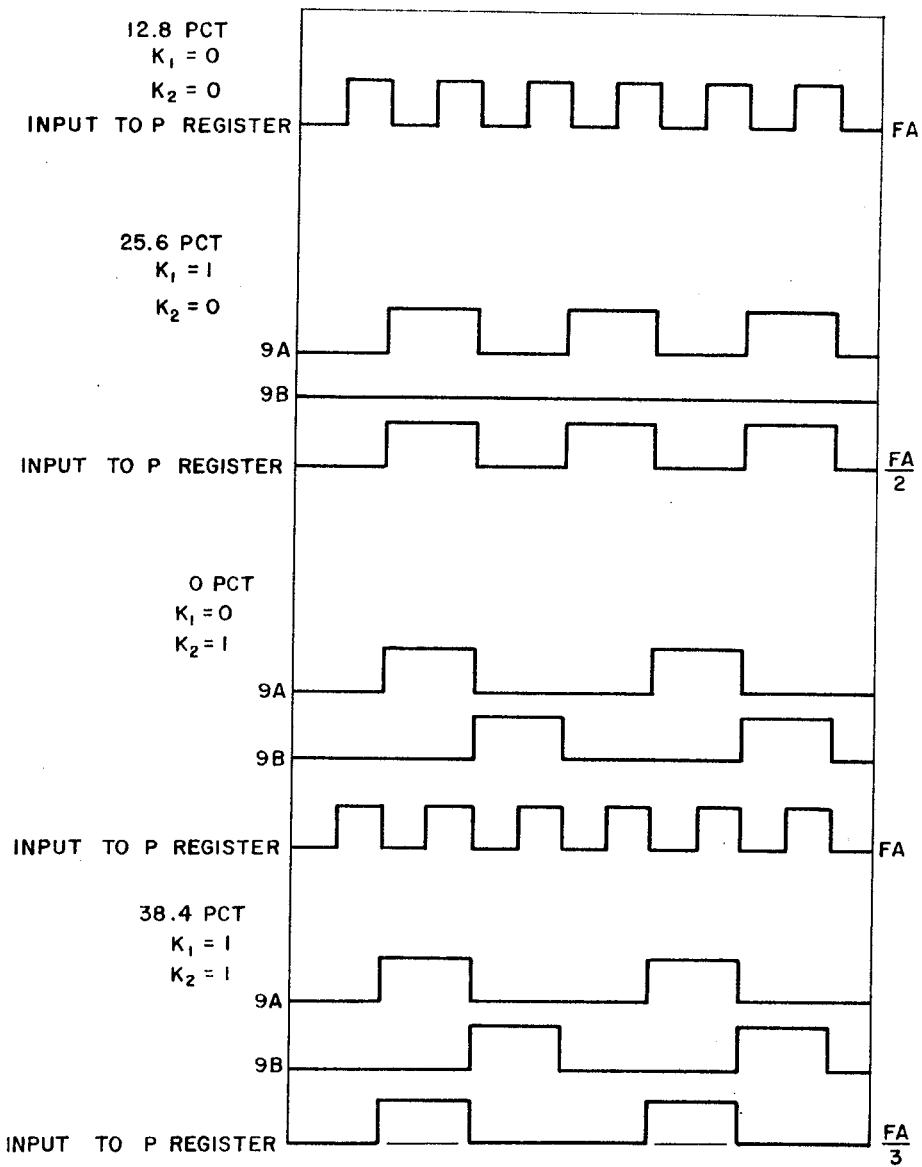
FIG. 7 illustrates programmer-frequency divider waveforms.
Figure 8A:
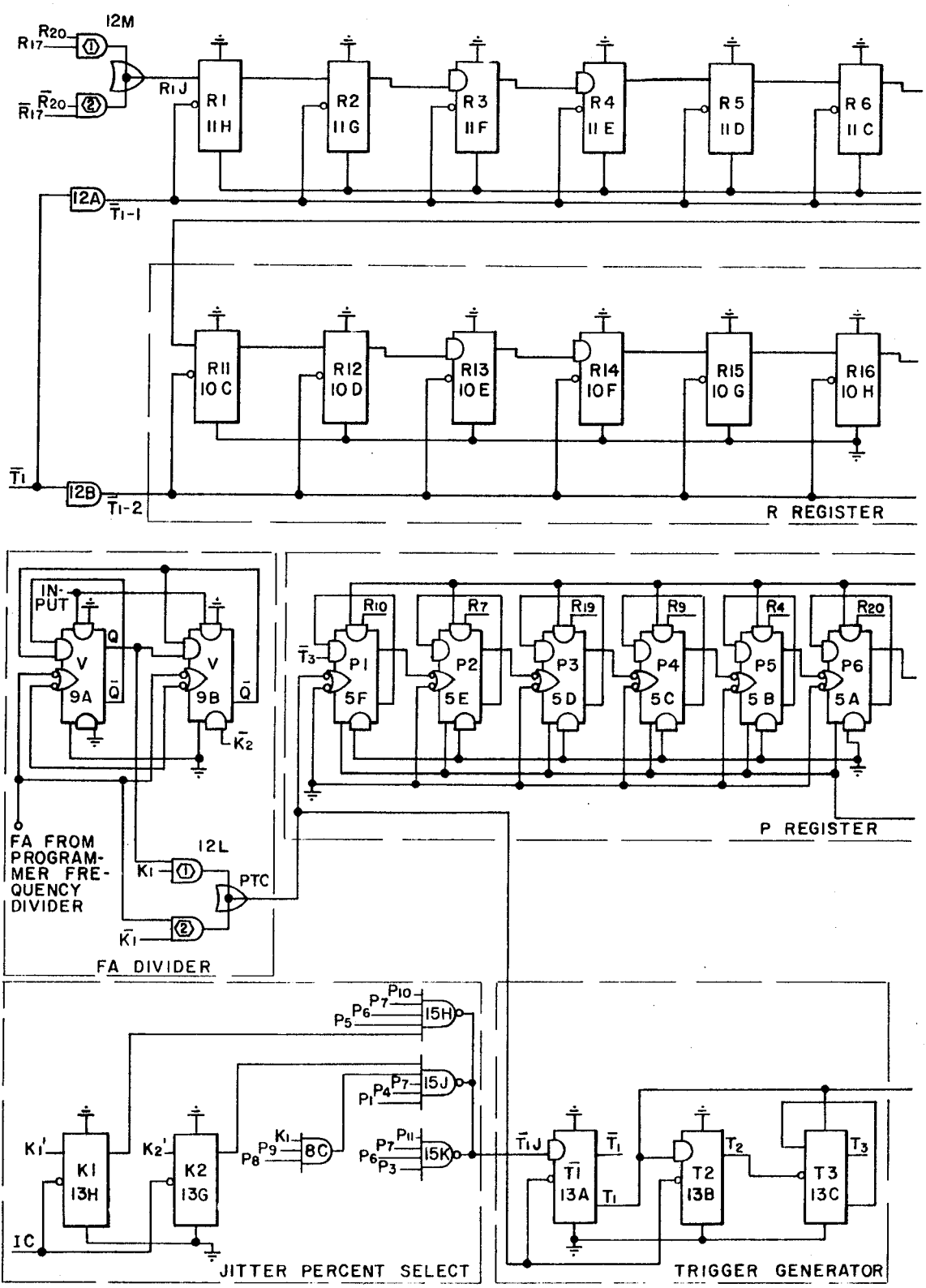
FIGS. 8a and 8b are a logic diagram of the 20-bit pseudorandom function.
Figure 8B:
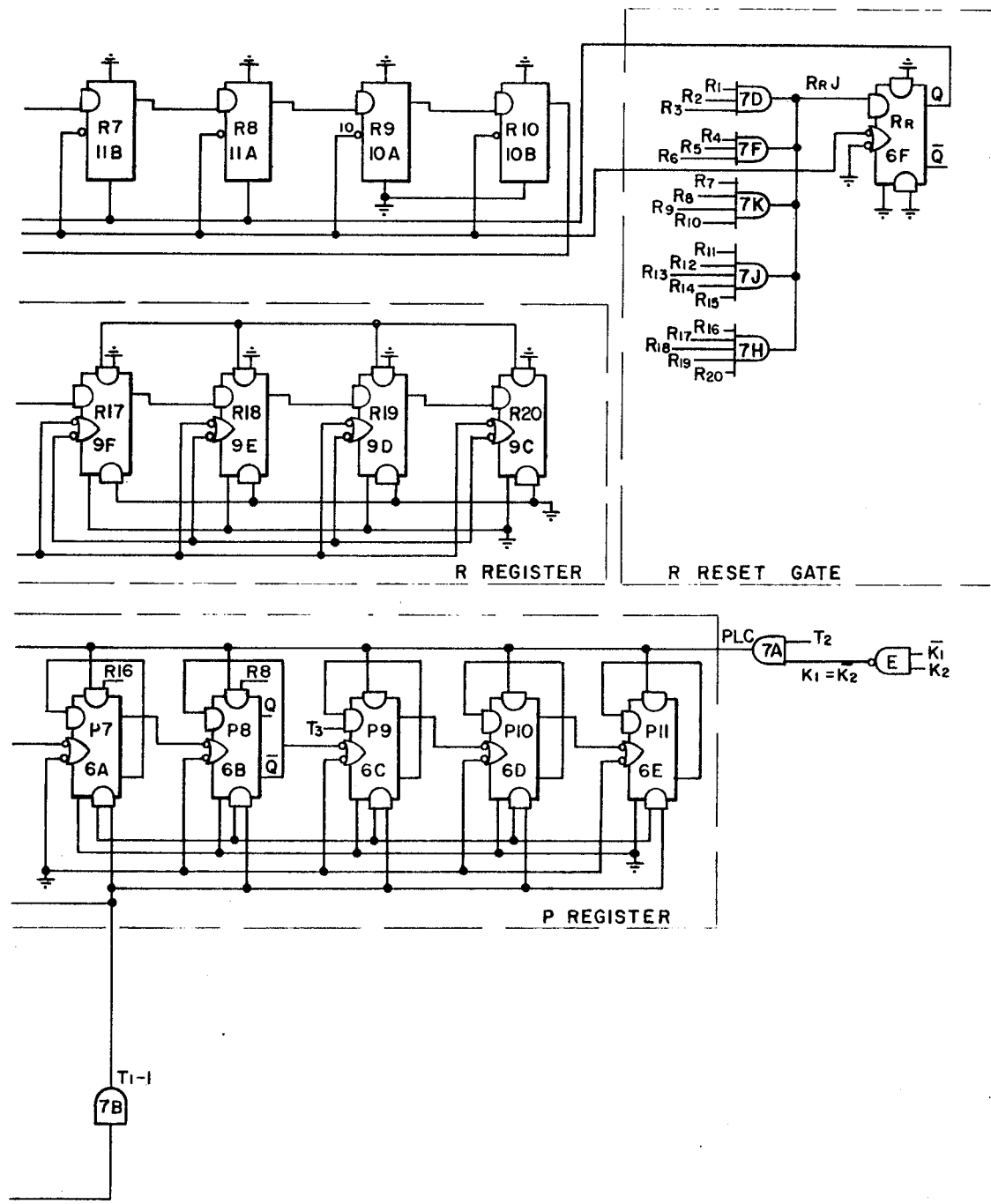

This subjection comprises inspect change (IC) flip-flop 13F and code storage flip-flops 17B, 17C, 17D, 17E, and 17F. Inspect change flip-flop 13F receives $H$ (code permitted) from the Inspect for Unwanted Codes function; trigger T2 from the 20-bit pseudorandom function; and PTC from the programmer-frequency divider function. Trigger T2 and H are ANDed at the set input, and PTC is fed to the clock input of IC flip-flop 13F. When $H$ is TRUE, an IC pulse is developed, see FIG. 7. The IC pulse from 13F is fed to the five code storage flip-flops 17B, 17C, 17D, 17E, and 17F and also flip-flops 13G and 13H in the 20-bit pseudorandom function, FIG. 8. When IC is TRUE, the code storage slip-flops respond to a new code set into the PROGRAM SELECTOR. When IC is FALSE, the code storage flip-flops are not triggered to change state, and continue to remain set to the last permitted code set into the PROGRAM SELECTOR. Each flip-flop receives the corresponding code digit set into the PROGRAM SELECTOR. Flip-flops and related codes are given below.

| Flip-flop | Input digit | Output digits |
|---|---|---|
| 17B | E'' | E', $\overline{E'}$ |
| 17C | D'' | D', $\overline{D'}$ |
| 17D | C'' | C', $\overline{C'}$ |
| 17E | B'' | B', $\overline{B'}$ |
| 17F | A'' | A', $\overline{A'}$ |

Outputs of the code storage are used in the pattern generator and the comparator.

Pattern Generator

This subfunction, which comprises buffered NAND gates 15A, 15B, 15D, 15F, and 19B; buffered AND/OR gates 14F and 14G; buffered AND gate 12C; and flip-flops 2C, 16A, 16B, 16C, 16D, and 16E, generates a pseudorandom sequence of 32 five-digit binary numbers (see Table 7). Frequency division is accomplished by introduction of a program digit W, which causes the pattern generator to skip the number of steps required to reduce the remaining number of steps to the desired value of y, see Table 1.

| Clock-pulse Number | E | D | C | B | A | y |
|---|---|---|---|---|---|---|
| 1 | 1 | 0 | 0 | 0 | 0 | 7 |
| 2 | 1 | 1 | 0 | 0 | 0 | 18 |
| 3 | 1 | 1 | 1 | 0 | 0 | 17 |
| 4 | 0 | 1 | 1 | 1 | 0 | 8 |
| 5 | 0 | 0 | 1 | 1 | 1 | 12 |
| 6 | 1 | 0 | 0 | 1 | 1 | 27 |
| 7 | 0 | 1 | 0 | 0 | 1 | 15 |
| 8 | 0 | 0 | 1 | 0 | 0 | 11 |
| 9 | 0 | 0 | 0 | 1 | 0 | 9 |
| 10 | 1 | 0 | 0 | 0 | 1 | 4 |
| 11 | 0 | 1 | 0 | 0 | 0 | 29 |
| 12 | 1 | 0 | 1 | 0 | 0 | 21 |
| 13 | 0 | 1 | 0 | 1 | 0 | 2 |
| 14 | 1 | 0 | 1 | 0 | 1 | 26 |
| 15 | 1 | 1 | 0 | 1 | 0 | 13 |
| 16 | 1 | 1 | 1 | 0 | 1 | 18' |
| 17 | 1 | 1 | 1 | 1 | 0 | 14 |
| 18 | 0 | 1 | 1 | 1 | 1 | 28 |
| 19 | 1 | 0 | 1 | 1 | 1 | 5 |
| 20 | 1 | 1 | 0 | 1 | 1 | 25 |
| 21 | 0 | 1 | 1 | 0 | 1 | 3 |
| 22 | 1 | 0 | 1 | 1 | 0 | 10 |
| 23 | 0 | 1 | 0 | 1 | 1 | 16 |
| 24 | 0 | 0 | 1 | 0 | 1 | 19 |
| 25 | 1 | 0 | 0 | 1 | 0 | 24 |
| 26 | 1 | 1 | 0 | 0 | 1 | 6 |
| 26 | 0 | 1 | 1 | 0 | 0 | 23 |
| 28 | 0 | 0 | 1 | 1 | 0 | 20 |
| 29 | 0 | 0 | 0 | 1 | 1 | 30 |
| 30 | 0 | 0 | 0 | 0 | 1 | 32 |
| 31 | 0 | 0 | 0 | 0 | 0 | 22 |
| 32 | 1 | 0 | 0 | 0 | 0 | 7 |

Pattern generator operation is as follows:

One clock pulse after the digits in the five stages (16A – 16E) of the shift register of the pattern generator match the five digits set into the PROGRAM SELECTOR an FA pulse is generated and W goes TRUE.

The five digits present at the outputs of the five stages of the register are designated E, D, C, B, and A. These digits are shifted from E toward A at each clock pulse. The digit EJ entered into the E stage 16A is $$A\overline{C}W + \overline{A}CW + AC\overline{W} + \overline{AC}\overline{W} = EJ$$

The above equation gives the value of EJ entered into the register one clock pulse after W goes TRUE. Thus, if a TRUE is present in E stage 16A, a FALSE is present in each of the other four stages, and W remains FALSE.

The program generator sequences from CP1 to CP2 as shown in Table 7.

To illustrate operation of the pattern generator assume that
$$0\ 1\ 1\ 1\ 0\ (y=8)$$
is set into the PROGRAM SELECTOR and the shift register (16A – 16E) starts at CP (clock pulse) 1. The shift register steps through CP2, CP3, and CP4 according to Table 7. At CP4, the code in the register becomes identical to that set into the PROGRAM SELECTOR. This condition is detected by the comparator. At CP5, W(flip-flop 13D) becomes TRUE. Since $A\overline{C}W$ and $\overline{A}CW$ are FALSE, E (stage 16A) becomes FALSE (0) at CP6, and the pattern becomes
$$0\ 0\ 0\ 1\ 1$$
This pattern normally appears at CP29. The shift register then steps through the patterns shown in Table 7 for CP30, CP31, CP32, CP2, CP3, and CP4 (thus counting down the 6-Mc clock pulses by a factor of 8), and FA becomes 750 pps.

The foregoing cycle repeats until the setting of the PROGRAM SELECTOR is changed. Other values of y are produced in a similar manner.

Buffered NAND gate 19B is connected to reset the first stage of the shift register when A', B', C', D', and E' are all TRUE and, thus, prevent lockout of the register. Buffered AND/OR gate 14G is connected to flip-flop 2C to produce a reset pulse which is applied to all stages of the register to prevent lockout when A, B, C, D, and E are all TRUE.

Buffered NAND gates 15A, 15B, 15D, and 15F are connected to mechanize the equation:

$$ACW + ACW + ACW + ACW = EJ$$

The EJ output of these gates drives the first stage of the shift register.

Comparator

This subfunction comprises buffered AND/OR gates 14A, 14B, 14C, 14D, 14E, and 14H; buffered AND gate 12D; and flip-flop 13D. It receives program code E' through A' from the code storage subfunction and the digits E through A from the pattern generator subfunction, compares them, and triggers the output flip-flop to produce FA, W, and $\overline{W}$ when all five pairs of digits match. Comparator operation is as follows:

Buffered AND/OR gate 14A mechanizes the equation $$A \cdot A' + \overline{A} \cdot \overline{A}' \cdot \overline{W} = AWJ$$

A' or $\overline{A}'$ is a steady voltage received from code storage flip-flop 17F. A or $\overline{A}$ is the digit appearing during one clock pulse in flip-flop 16A of the pattern generator. The output, AWJ, goes TRUE during the clock pulse when the input digits match. Five such AND/OR gates are used, one each of E and E', D and D', C and C', B and B', and A and A'. Operation of these gates is shown below.

| Gate | Equation |
|------|----------|
| 14A | $A \cdot A' + \overline{A} \cdot \overline{A}' \cdot \overline{W} = AWJ$ |
| 14B | $B \cdot B' + \overline{B} \cdot \overline{B}' \cdot \overline{W} = BWJ$ |
| 14C | $C \cdot C' + \overline{C} \cdot \overline{C}' \cdot \overline{W} = CWJ$ |
| 14D | $D \cdot D' + \overline{D} \cdot \overline{D}' \cdot \overline{W} = DWJ$ |
| 14E | $E \cdot E' + \overline{E} \cdot \overline{E}' \cdot \overline{W} = EWJ$ |

Output pulses AWJ, DWJ, and EWJ are ANDed in buffered gate 12D. Output pulses BWJ, CWJ and $\overline{W}$ are ANDed in gate 14H. Outputs of these two gates are ANDed at the set input to W flip-flop 13D. At the clock pulse following the occurrence of a TRUE state at the set input, the Q output of flip-flop 13D goes TRUE. This pulse is designated FA when forwarded to other subfunctions, but when used within this function it is designated W. A $\overline{W}$ pulse is taken from the $\overline{Q}$ output of the flip-flop.

As noted above, $\overline{W}$ was ANDed with BWJ and CWJ. This arrangement prevents generation of a W pulse while W is TRUE.

20-BIT PSEUDORANDOM FUNCTION

This function (see FIG. 8) comprises the R register, P register, FA divider, jitter percent select, trigger generator, R register and reset, transfer random word, and gate random count subfunctions.

FA Divider

This subfunction comprises flip-flops 9A and 9B and AND/OR gate 12L. The clock inputs of 9A and 9B receive FA. The Q output of 9A is fed to the set input of 9B. The FA divider receives FA, which it divides by 1, 2, or 3 to produce PTC (pseudo time count). The $\overline{Q}$ output of 9B is connected back to the set inputs of both 9A and 9B. The erase input of 9B receives $\overline{K}_2$. AND gate 1 of AND/OR gate 12L receives $K_1$ and the Q output of 9A. AND gate 2 receives FA and $\overline{K}_1$. See FIG. 9 for waveforms of the FA divider.

The following sets forth the action of gate 12L. When $K_1 = 0$ and $K_2 = 0$ (12.8 percent jitter), $K_1$ blocks AND gate 1 while $\overline{K}_1$ opens AND gate 2, and FA passes through AND gate 2 and the OR gate to the P register.

When $K_1 = 1$ and $K_2 = 0$ (25.6 percent jitter), $K_1$ opens AND gate 1 and $\overline{K}_2$ blocks AND gate 2. The resulting Q output of 9A, FA/2, passes through AND gate 1 and the OR gate to the P register.

When $K_1 = 0$ and $K_2 = 1$ (0 percent jitter), $K_1$ blocks AND gate 1, $\overline{K}_1$ opens AND gate 2, and FA is passed through AND gate 2 and the OR gate to the P register.

When $K_1 = 1$ and $K_2 = 1$ (38.4 percent jitter), $K_1$ opens AND gate 1 and $K_1$ blocks AND gate 2. The resulting FA/3 output of 9A is passed through AND gate 1 and the OR gate to the P register.

Jitter Percent Select

This subfunction comprises flip-flops 13H and 13G, NAND gates 15H, 15J, and 15K, and AND gate 8C. Flip-flop 13H is connected as follows: set input to $K_1'$, clock input to IC, and Q output to NAND gate 15H. Flip-flop 13G is connected as follows: set input to $K_2'$, clock input to IC, and Q output to NAND gate 15J.

NAND gate 15H is opened by $K_1'$ TRUE. The other inputs are connected to the P register as follows: P5 (count 16), P6 (count 32), P7 (count 64), and P10 (count 512). Thus, when $K_1'$ is TRUE and the P register has a count of 16 + 32 + 64 + 512 = 624, a $\overline{T}_1J$ pulse is sent to $\overline{T}_1$ flip-flop 13A in the trigger generator.

NAND gate 15J is opened by $K_2'$ TRUE and $K_1'$ TRUE. Other inputs to 15J are connected to the P register as follows: P1 (count 1), P4 (count 8), P7 (count 128), and through AND gate 8C to P8 (count 256) and P9 (count 512). The other input to AND gate 8C is connected to $K_1$. Thus, when $K_1 \cdot K_2 \cdot P1 \cdot P4 \cdot P7 \cdot P8 \cdot P9 = $ TRUE, a pulse $\overline{T}_1J$ is sent to the $\overline{T}_1$ flip-flop 13A in the trigger generator. This count is 1 + 8 + 64 + 128 + 256 = 457.

For either $K_1$ FALSE and $K_2$ TRUE or $K_1$ FALSE and $K_2$ FALSE, NAND gates 15H and 15J are disabled, and NAND gate 15K generates the $\overline{T}_1J$ pulse. P register inputs to this gate are: P3 (count 4), P6 (count 32) P7 (count 64), and P11 (count 1024). Thus, a count 4 + 32 + 64 + 1024 = 1124, a $\overline{T}_1J$ pulse is sent to the $\overline{T}_1$ flip-flop 13A in the trigger generator.

Function of the jitter percent select is summarized below.

| $K_2$ | $K_1$ | PCT jitter | Count |
|-------|-------|------------|-------|
| 0 | 0 | 12.8 | 1124 |
| 0 | 1 | 25.6 | 624 |
| 1 | 0 | 0 | 1124 |
| 1 | 1 | 38.4 | 457 |

In the foregoing discussion, the effect of random numbers set into the P register from the R register has been neglected. The P register, instead of counting from 0, counts from the random number set into it by the R register. Flip-flop 6B (P8) is reset by trigger T1, so that the count is always preset first to 128. If 0-percent jitter is set into the PROGRAM SELECTOR, the count remains at 128. If any other jitter percent is set, the count is preset by trigger T2 to a number from 0 to 255. $\overline{T}_3$ keeps P9 from turning on when P8 is set from the R register at T2 TRUE. In addition, other stages are connected as shown below.

| P register stage | Count | R register stage |
|------------------|-------|------------------|
| P1 | 1 | R10 |
| P2 | 2 | R12 |
| P3 | 4 | R17 |
| P4 | 8 | R9 |
| P5 | 16 | R2 |
| P6 | 32 | R11 |
| P7 | 64 | R16 |
| P8 | 128 | R8 |
| | 255 (sum) | |

Consequently, the count of the P register can start from any number from 0 to 255. The numbers transferred from the R register are random in pattern but, in any 256 consecutive counts, each count will occur once, so that the average is 128, and any given pattern will recur only once in $2^{12}$ series of $2^8$ pulses.

Trigger Generator

Figure 9:
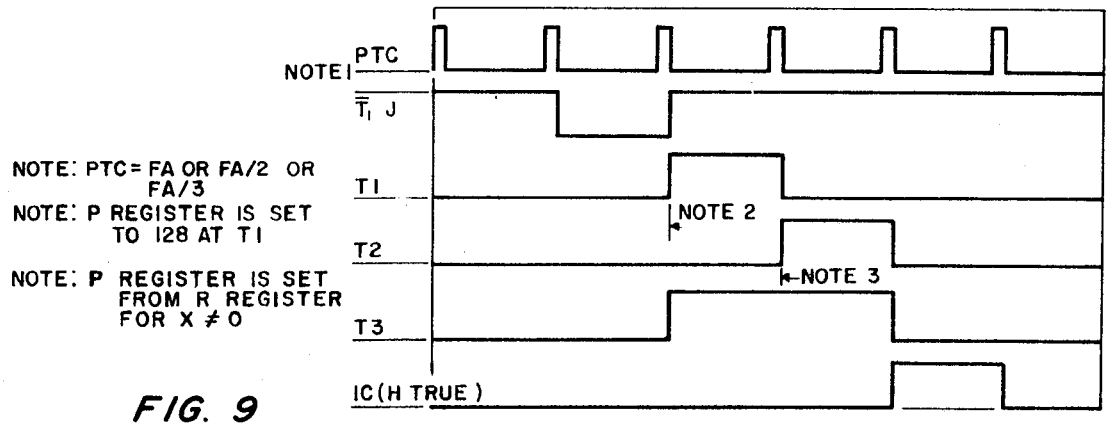
FIG. 9 illustrates FA divider waveforms.

This subfunction, which comprises flip-flops 13A, 13B, and 13C, generates three triggers, T1, T2, and T3, as shown in FIG. 9. Trigger $\overline{T1}$ is amplified and delayed by 12A to produce T1-1, which is connected to the clock inputs of stages R1 through R10 of the R register, amplified and delayed by 12B to produce $\overline{T1}$-2, which is connected to the clock inputs of stages R11 through R20 of the R register. Trigger T1 is ammplified and delayed by 7B to produce T1-1, which is fed to the erase inputs of all stages of the P register. Trigger T2 is sent to the delay counter (FIG. 10) and the transfer random word gate. Trigger T3 is connected to the set input of P1 and disables the P register. The trailing edge of T3 is three counts behind $T_1J$ and, since P1 takes another count to start, the actual count in the P register starts four counts behind $\overline{T}_1J$. Thus, in effect, counting in the P register starts at 628, 461, and 1028, respectively, rather than 624, 457, and 1024.

R Register

The R register comprises flip-flops R1 through R20, and can count from 0 to 1,048,175. This register is shifted by the $\overline{T1}$-1 and $\overline{T1}$-2 triggers. A pseudorandomly varying count (0 to 255) is connected from the stages of the R register to the stages of the P register as explained under jitter percent select.

The R register is reset by the R register-reset gate at the count of 1,048,176. This register-reset comprises AND gates 7D, 7F, 7H, 7J, and 7K. All 20 stages of the R register are connected to the inputs of these gates. Outputs of these gates are ANDed to produce $R_RJ$, which occurs at count 1,048,175. The set input of $R_R$ flip-flop 6F is connected to $R_RJ$ and the clock input to T1-1. At the trailing edge of $\overline{T1}$, the Q output of $R_R$ flip-flop 6F produces a pulse which is fed to the erase inputs of the first eight stages of the R register so that the R register is partially reset.

AND/OR gate 12M is connected to the set input of R1 to cause the R register to count pseudorandomly. Outputs of R17 and R20 are connected to AND gate 1 of 12M, and R17 and R20 outputs are connected to AND gate 2 of 12M, so that a bit is introduced into the register whenever $R17 \cdot R20 = 1$ or $\overline{R17} \cdot \overline{R20} = 1$.

Seven various bits of the random word generated in the R register are set into the P register at T2 by a pulse from buffered AND gate 7A. Buffered NAND gate 15E receives, $\overline{K}_1$ and $K_2$ and produces $K_1 + \overline{K}_2$ which is connected to one input of gate 7A. The other input of gate 7A is connected to T2. The output of gate 7A is connected to the mark inputs of P1 through P8 so that the random numbers from stages of the R register are transferred to stages of the P register at T2 when a jittered code is set into the PROGRAM SELECTOR.

P Register

The P register, whose functions were discussed earlier, comprises flip-flop counter stages P1 through P11. The clock input of P1 receives PTC, so that the count in the register is based on PTC. The count starts one PTC after the trailing edge of T3 and is, thus, coincident with the fourth count. All stages of this register, except P9, are reset to FALSE by T1-1. The $\overline{Q}$ output of P8 drives P9. In addition to the conventional feedback, $\overline{T3}$ is connected to the set input of P9. When the register is reset by T1-1, P8 effectively goes TRUE since its output is taken from the $\overline{Q}$ output, and the P register is effectively reset to 128 instead of 0. The random word is set into the P register by T2 when permitted by $K_1$ and $K_2$.

DELAY COUNTER

The delay counter function (FIG. 10) comprises a 6-Mc clock oscillator with buffered AND/OR gate, a 10-bit binary counter, 11 flip-flops used for timing and gating, buffered AND gates, plus one toggle switch, RAIN REJECT-NORMAL, SW5. This function receives the T2 pulse from the 20-bit pseudorandom function and clock pulses from the 6-Mc oscillator and produces all pulses shown in FIG. 1.

Oscillator

The 6-Mc clock oscillator is crystal controlled. If desired, an external oscillator can be connected to the EXT 6-Mc receptacle. After shaping, the internal clock pulse (CP) is ANDed with the $\overline{Q}$ output of 0 flip-flop 17A. When 0' is FALSE (see Table 2), the Q output of the 0 flip-flop 17A is FALSE and the $\overline{Q}$ output is TRUE. The upper AND gate of the buffered AND/OR gate 40A is closed by one grounded input. The center AND gate is closed by Q FALSE from the 0 flip-flop. The lower AND gate is opened by $\overline{Q}$ TRUE from the 0 flip-flop, and the 6-Mc clock pulses from the internal oscillator pass through to the OR gate. The other inputs to the OR gate are FALSE, and the clock pulses pass through the OR gate to other circuits, which require a 6-Mc clock pulse. When 0' is TRUE, the Q output of the 0 flip-flop is TRUE and the $\overline{Q}$ output is FALSE. Q TRUE opens the center AND gate, and the 6-Mc clock pulses from the external oscillator pass through the AND gate and the OR gate. Output of the internal oscillator is blocked by $\overline{Q}$ FALSE at the lower AND gate.

Counter

The C register is a 10-bit binary counter. Count is started by the leading edge of $\overline{A}$, from flip-flop 1F, (see FIG. 11) and is reset by CE from flip-flop 2A. To ensure that all stages except C1 reset to 0, $\overline{MB}$ is connected to the set inputs of C4 (count 8), C7 (count 64), and C9 (count 256). The outputs of C2, C3, C5, C7, and C10 are connected to AND gate 8J so that, when the count reaches $2 + 4 + 16 + 64 + 512 = 598$, the MBJ output of the AND gate 8J goes TRUE and remains TRUE until C2 goes FALSE at the start of count 600. Output of the MBJ gate 8J causes the output of the MB flip-flop 2D to go TRUE for two clock pulses, thus generating the output MB pulse. When the first stage of the C register is reset at the 600th CP, the $\overline{A}$ TRUE from flip-flop 1F connected to the set input holds a TRUE count in this stage, so that the count in the register actually starts from 1 instead of 0.

Figure 11:
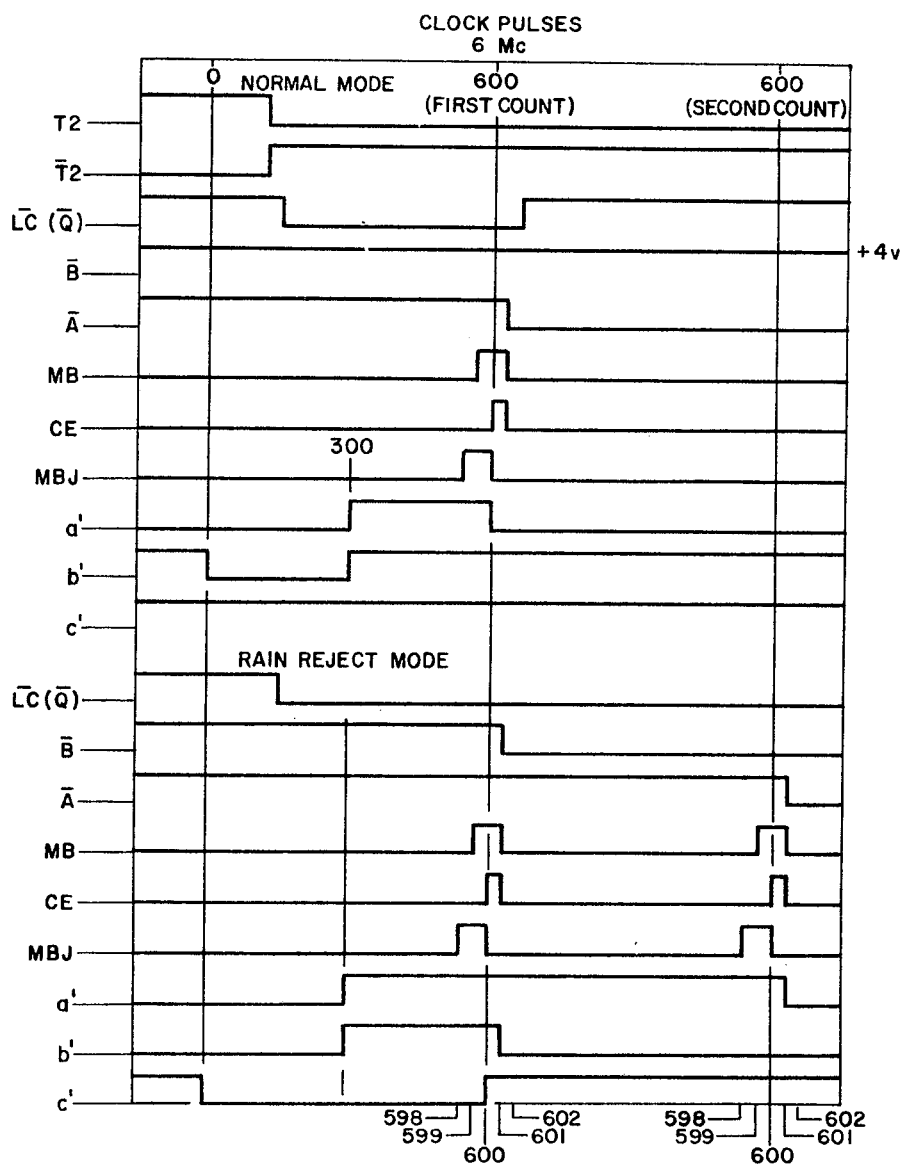
FIG. 11 illustrates delay counter waveforms.

Timing and Gating (FIG. 11)

Figure 10:
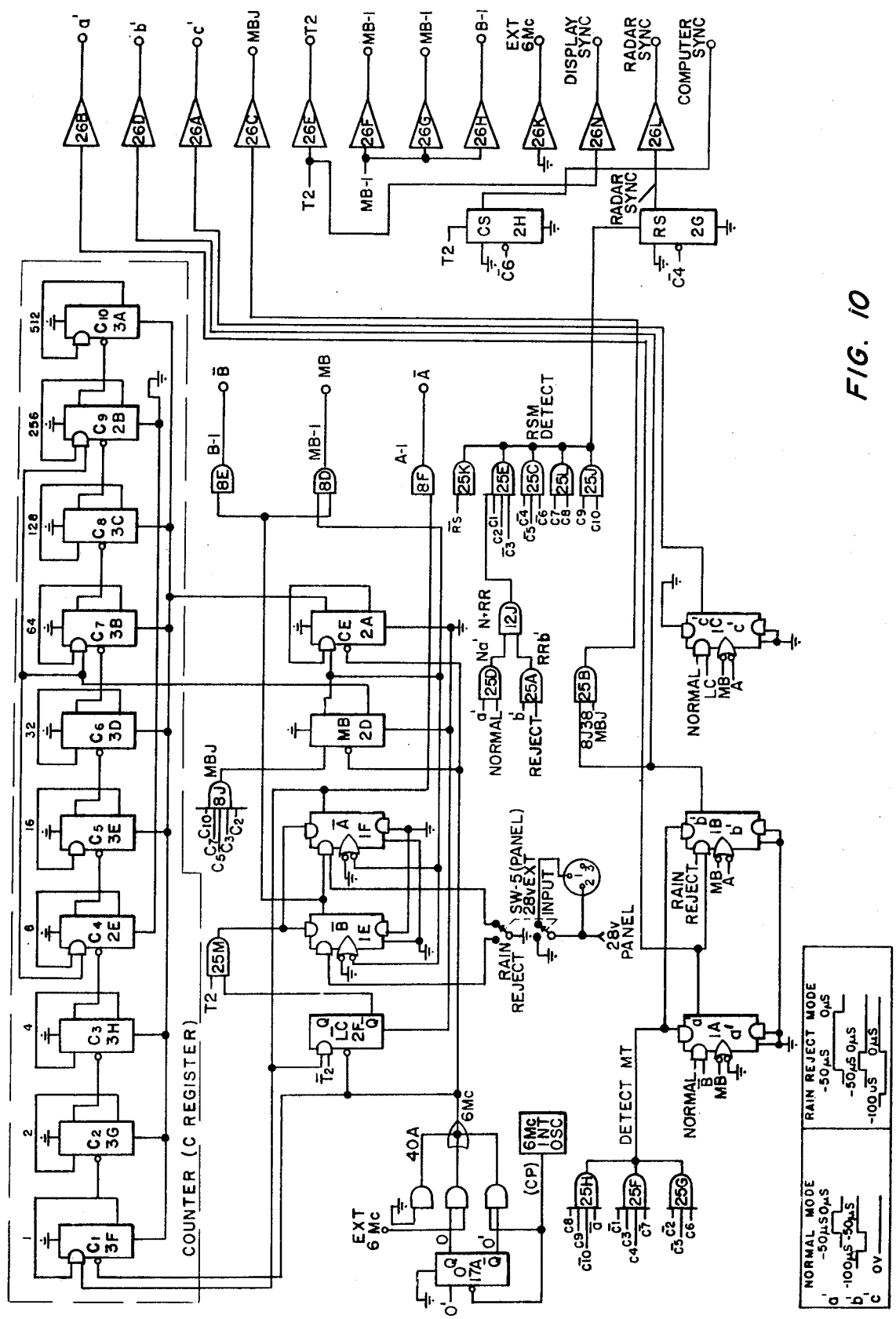
FIG. 10 is a logic diagram of the delay counter.

This subfunction comprises the $\overline{LC}$, $\overline{B}$, $\overline{A}$, MB, CE, $a'$, $b'$, $c'$, computer sync, and radar sync flip-flops of FIG. 10. The output function comprises $\overline{A}$, $\overline{B}$, and MB buffered AND gates at test points, and $a'$, $b'$, $c'$, MBJ, T2, MB–1, display sync, and radar sync cable line drivers.

The set inputs of $\overline{LC}$ flip-flop 2F are connected to $\overline{T2} \cdot \overline{A}$. Output is taken from $\overline{Q}$ only. The clock input is driven by the clock pulse from AND/OR gate 40A. During the quiescent state, the $\overline{Q}$ output remains TRUE since $\overline{T2} \cdot \overline{A}$ = FALSE. The input becomes TRUE at the trailing edge of $\overline{T2}$, and the $\overline{Q}$ output goes FALSE one CP later. When $\overline{A}$ goes FALSE, the $\overline{Q}$ output of $\overline{LC}$ goes TRUE one CP later.

In the normal mode, T2 · $\overline{LC(Q)}$ are connected, via buffered AND gate 25L, to the mark input of flip-flops $\overline{B}$ and $\overline{A}$, and MB is connected to their respective clock input. The set input of $\overline{B}$ is left open, and the erase input is grounded; therefore, the output of the $\overline{B}$ flip-flop remains TRUE during operation in the NORMAL mode.

In the RAIN REJECT mode, the set input to flip-flop $\overline{B}$ is grounded. In this configuration, $\overline{B}$ goes TRUE at the leading edge of T2 and remains TRUE until the trailing edge of MB resets the flip-flop 1E to FALSE.

In the NORMAL mode, $\overline{LC(Q)} \cdot$ T2 is also connected, via buffered AND gate 25L, to the mark input of the $\overline{A}$ flip-flop 1F. Ground and $\overline{B}$ are connected to the set input, and MB is connected to the clock input from AND/OR gate 20A. The $\overline{A}$ erase input is grounded. During the quiescent state, the $\overline{A}$ output is FALSE. Output of this flip-flop goes TRUE coincident with the leading edge of T2. The trailing edge of the MB pulse resets $\overline{A}$.

In the RAIN REJECT mode, the Q output of $\overline{B}$ flip-flop 1E is connected to one set input of the $\overline{A}$ flip-flop, and the other set input is open. Other connections to the $\overline{A}$ flip-flop remain the same as for the NORMAL mode. Output of the $\overline{A}$ flip flop goes TRUE at the leading edge of T2 and remains TRUE until the trailing edge of the second MB.

The set input of MB flip-flop 2D is connected to the output of AND gate 8J and the clock input is connected to the 6-Mc clock pulse from AND/OR gate 40A. When the count reaches 598, AND gate 8J goes TRUE and remains TRUE until count 600. Consequently, the output of the MB flip-flop 2D goes TRUE at count 599 and remains TRUE until count 601. It is to be remembered that, as noted above, the C register starts from a count of 1.

The set input of $\overline{CE}$ flip-flop 2A is connected to MB and $\overline{CE(Q)}$, and the clock input is connected to the 6-Mc clock pulse from AND/OR gate 40A. The erase input is grounded. One CP after MB goes TRUE, the output of flip-flop CE goes TRUE and remains TRUE for one CP. Output of this flip-flop resets the counter.

When in the RAIN REJECT mode (FIG. 11), the counter is reset by the first CE pulse but resumes counting, since $\overline{A}$ remains TRUE. Upon reaching a second count of 599 the output of AND gate 8J goes TRUE, and a second MB pulse is generated. This pulse triggers CE, resets the counter, and causes $\overline{A}$ to go FALSE. The count is stopped, and the $\overline{LC}$ flip-flop resets for arrival of the next T2. Output of the second MB to the front test point is inhibited by AND gate 8D, since $\overline{B}$ is FALSE at this time.

The outputs of front test points $\overline{A}$ and $\overline{B}$ are buffered by AND gates 8F and 8E, respectively.

In both the NORMAL and the RAIN REJECT modes, the outputs of buffered AND gates 25H, 25F, and 25G are connected to the mark inputs of a $a$ flip-flop 1A and $b'$ flip-flop 1B, and in both modes $a'$ and $b'$ go TRUE at count 301.

In the NORMAL mode the set input to flip-flop 1A is grounded, and $a'$ goes FALSE at the trailing edge of MB. In the RAIN REJECT mode, the TRUE state of $\overline{B}$ inhibits (flip-flop 1A) $a'$ from resetting until the trailing edge of the second MB.

In the NORMAL mode, $b'$ (flip-flop 1B) remains TRUE from count 301 until it is reset by A going TRUE at the leading edge of T2. In the RAIN REJECT mode, $b'$ (flop-flop 1B) goes FALSE coincident with the trailing edge of the first MB.

AND gate 25B outputs two MBJ pulses in the RAIN REJECT mode; however, the second MBJ pulse is inhibited by the FALSE state of $b'$ (flip-flop 1B).

Since the outputs of the delay counter must travel through 100 feet of coaxial cable, line drivers and receives were installed to buffer between the counter logic and the cables.

In the NORMAL mode, $c'$ flip-flop 1C goes FALSE at the trailing edge of MB and remains FALSE because both the mark and set inputs to $c'$ are grounded. In the RAIN REJECT mode, $\overline{LC(Q)}$ is FALSE, inhibiting $c'$ from going TRUE until the trailing edge of the first MB; $c'$ remains TRUE until $\overline{A}$ goes TRUE, at which time $\overline{LC(Q)}$ is also TRUE.

The display sync pulse T2 is driven through line driver 26N to the radar's PPI display. The computer sync pulse flip-flop 2H is set by the leading edge of T2 and reset by the trailing edge of $\overline{C6}$, producing a 5.33-$\mu$sec pulse, which is applied directly to the Datum unit.

The radar sync pulse is used as a pre-knock pulse which must come approximately 25 $\mu$sec before MB. In both the NORMAL and the RAIN REJECT modes, the outputs of buffered AND gates 25C, 25E, 25J, 25K, and 25L are connected to the mark input of flip-flop 2G, which goes TRUE the first time count of 451 is detected (at -25 $\mu$sec). It is reset 1:33 $\mu$sec later by $\overline{C4}$. The second time a count of 451 is reached (at +75 $\mu$sec), it is inhibited from reaching 2G because the output of OR gate 12J is TRUE only from $-50$ $\mu$sec to 0. The radar sync pulse is driven through line driver 26L to the radar synchronizer.

What is claimed is:

1. A programmable pseudorandom pulse repetition frequency (PRF) generator capable of outputting a pulse having various combinations of PRF and jitter percent comprising:

program selector means for selecting particular combinations of frequency and jitter percent;

frequency producing means for generating a constant output frequency;

code comparison means operatively connected to said program selector means for comparing the selected combination of frequency and jitter percent against a permitted combination of frequency and jitter percent and outputting an enable signal when a permitted combination has been selected;

frequency divider means operatively connected to said code comparison means and said frequency producing means and receiving a digital word determinative of a divisor, an enable signal and a constant output frequency from the code comparison means and frequency producing means respectively and dividing said frequency in accordance with said digital word to produce an average frequency FA;

pseudorandom generator means operatively connected to said code comparison means and said frequency divider means and receiving signals corresponding to permitted jitter percent and FA, respectively, and generating an output pulse which is jittered in accordance with the jitter percent such that the average frequency of the jittered pulse is the same as the average frequency of the unjittered pulse.

2. A programmable pseudorandom pulse repetition frequency generator as set forth in claim 1 wherein;

said code comparison means comprises a logic matrix for screening the preset code for unwanted codes.

3. A programmable pseudorandom pulse repetition frequency generator as set forth in claim 1 wherein;

said frequency divider means includes code storage means for receiving and storing the code selected by the program selector means; and further including pattern generator means for generating a pseudorandom sequence of five digit binary numbers, said pattern generator outputting a desired devisor Y;

said comparison means operatively receiving the program code from the code storage subfunction and the digit from the pattern generator subfunction for comparing them and producing an output pulse.

4. A programmable pseudorandom pulse repetition frequency generator as set forth in claim 1 including;

jitter percent select means for generating an output corresponding to the selected jitter percent included in said program selector means;

P register means included in said pseudorandom generator means for producing a random count;

an R register means included in said pseudorandom generator means for generating a pseudorandomly varying count which is connected from the stages of the R register to the stages of the P register to generate the jitter pulse to jitter on the output pulse of the pulse repetition frequency generator.

5. A programmable pseudorandom pulse repetition frequency generator as set forth in claim 1 and further including;

delay counter means operatively receiving the output pulse from the pseudorandom generator means and clock pulses from the frequency producing means and in turn producing output pulses corresponding to the radar trigger pulse and other pulses adapted for use with multitrack radar.

6. A programmable pseudorandom pulse repetition frequency generator as set forth in claim 1 and further including;

commutator means operatively connected to said program selector means and receiving inputs therefrom and having an output connected to said code screening means and functioning to route the selected program to the code screening means.

* * * * *